(12) United States Patent
Haehnle et al.

(10) Patent No.: US 8,097,126 B2
(45) Date of Patent: *Jan. 17, 2012

(54) AQUEOUS COMPOSITION AND USE THEREOF FOR PAPER PRODUCTION

(75) Inventors: Hans-Joachim Haehnle, Neustadt (DE); Anton Esser, Limburgerhof (DE); Volker Braig, Weinheim-Luetzelsachsen (DE); Rainer Blum, Mannheim (DE); Peter Baumann, Boehl-Iggelheim (DE); Jacques Dupuis, Ketsch (DE); Josef Neutzner, Neustadt (DE)

(73) Assignee: BASF SE, Ludwigshafen (DE)

( * ) Notice: Subject to any disclaimer, the term of this patent is extended or adjusted under 35 U.S.C. 154(b) by 1259 days.

This patent is subject to a terminal disclaimer.

(21) Appl. No.: 11/181,993

(22) Filed: Jul. 15, 2005

(65) Prior Publication Data

US 2006/0037725 A1 Feb. 23, 2006

Related U.S. Application Data

(63) Continuation-in-part of application No. 10/539,503, filed as application No. PCT/EP2004/008295 on Jul. 23, 2004.

(30) Foreign Application Priority Data

Jul. 25, 2003 (DE) .................................. 103 34 133

(51) Int. Cl.
*D21H 17/33* (2006.01)
*D21H 17/63* (2006.01)

(52) U.S. Cl. ..................... 162/166; 162/158; 162/164.1; 162/164.6; 526/72; 526/278; 526/286; 526/303.1; 526/317.1; 526/318.2; 106/400; 106/401

(58) Field of Classification Search .................... 526/72, 526/278, 286, 303.1, 317.1, 318.2; 162/158, 162/164.1, 164.6, 166; 106/400, 401
See application file for complete search history.

(56) References Cited

U.S. PATENT DOCUMENTS

| 4,799,964 | A | * | 1/1989 | Harvey et al. ................ 106/436 |
|---|---|---|---|---|
| 5,008,321 | A | | 4/1991 | Hartmann et al. |
| 5,126,395 | A | * | 6/1992 | End et al. ...................... 524/801 |
| 5,630,907 | A | | 5/1997 | Nilz et al. |
| 5,779,785 | A | * | 7/1998 | Payton et al. ................. 106/487 |
| 6,057,404 | A | | 5/2000 | Utecht et al. |
| 6,184,310 | B1 | * | 2/2001 | Utecht et al. ................ 525/359.4 |
| 7,034,068 | B1 | * | 4/2006 | Negele et al. .................. 524/45 |
| 2002/0088579 | A1 | | 7/2002 | Forsberg et al. |
| 2005/0014887 | A1 | * | 1/2005 | Leduc et al. .................. 524/504 |

FOREIGN PATENT DOCUMENTS

| DE | 103 22 266 | 12/2004 |
|---|---|---|
| EP | 0 251 182 | 1/1988 |
| EP | 0 374 646 | 6/1990 |
| EP | 0 528 409 | 2/1993 |
| JP | 8-059740 | 3/1996 |
| WO | 94/13882 | 6/1994 |
| WO | 97/42229 | 11/1997 |
| WO | 00/59965 | 10/2000 |
| WO | WO 01/40578 A1 | 6/2001 |

OTHER PUBLICATIONS

Smook, "Handbook for Pulp & Paper Technologists", 2nd ed. Angus Wilde Publications, 1992, p. 220.*

* cited by examiner

*Primary Examiner* — Matthew Daniels
*Assistant Examiner* — Dennis Cordray
(74) *Attorney, Agent, or Firm* — Oblon, Spivak, McClelland, Maier & Neustadt, L.L.P.

(57) ABSTRACT

The present invention relates to an aqueous composition comprising at least one finely divided filler and at least one water-soluble amphoteric copolymer, a process for the preparation of such a composition and its use as an additive in the production of paper, cardboard and board.

16 Claims, No Drawings

AQUEOUS COMPOSITION AND USE THEREOF FOR PAPER PRODUCTION

This application is a Continuation-in-Part of U.S. National Stage Application filed Jun. 17, 2005 (Ser. No. 10/539,503) which is based on PCT/EP04/08295 filed Jul. 23, 2004 which claims priority to Germany Patent Application DE 103 34 133.1 filed Jul. 25, 2003, the entire contents of each are hereby incorporated by reference.

BACKGROUND OF THE INVENTION

1. Field of the Invention

The present invention relates to an aqueous composition comprising at least one finely divided filler and at least one water-soluble amphoteric copolymer, a process for the preparation of such a composition and its use as an additive in the production of paper, cardboard and board.

2. Description of the Related Art

Polymers having a large number of ionically dissociable groups in the main chain and/or in a side chain are referred to as polyelectrolytes. If these polymers have both anionogenic/anionic and cationogenic/cationic groups, they are amphoteric polyelectrolytes or ampholytic polymers, respectively. They are generally water-soluble or at least water-dispersible and have a wide range of applications, inter alia in the area of papermaking.

EP-A-0 251 182 discloses a process for the preparation of polymers, a mixture of N-vinylformamide and acrylonitrile or methacrylonitrile being polymerized in the presence of free radical initiators, and the polymers then being modified by treatment with acids. The modified polymers are said to contain vinylamine units in the form of salts, vinylformamide units and acrylonitrile or methacrylonitrile units and, if appropriate, acrylamide units and acrylic acid units. The reworking of examples of this publication has, however, shown that the polymers hydrolyzed with acids contain considerable amounts of amidine units of the formula

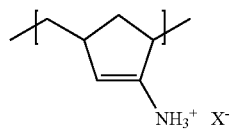

The hydrolyzed polymers are used as drainage aids, retention aids or for strengthening the paper in papermaking.

EP-A-0 528 409 discloses cationic copolymers which contain from 20 to 90 mol % of amidine units. They are prepared by copolymerization of N-vinylformamide and acrylonitrile and subsequent hydrolysis of the copolymers with acids. The polymers containing amidine units are used as flocculants for sludges.

WO 94/13882 relates to the use of copolymers which are obtainable by copolymerization of N-vinylcarboxamides, monoethylenically unsaturated carboxylic acids and, if appropriate, vinyl acetate, N-vinylpyrrolidone and/or N-vinylimidazole and, if appropriate, monomers having at least two double bonds in the molecule and subsequent partial or complete hydrolysis of the vinylcarboxamide units contained in the copolymers to amino or ammonium groups as an additive for the paper stock for increasing the drainage rate and the retention and the dry and wet strength of the paper in papermaking. As analyses have shown, hydrolyzed copolymers of N-vinylformamide and acrylic acid may contain considerable amounts of amidine units of the following formula

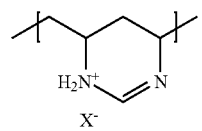

where $X^-$ is an anion.

JP-A-08059740 discloses that amphoteric water-soluble polymers are added to aqueous suspensions of inorganic particles, at least a part of the polymers being adsorbed onto the filler surface. The amphoteric polymers are preferably prepared by hydrolysis of copolymers of N-vinylformamide, acrylonitrile and acrylic acid in the presence of acids. They contain from 20 to 90 mol % of amidine units of the structure

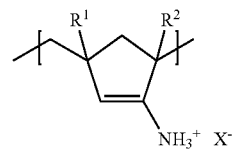

where $R^1$ and $R^2$ are each H or a methyl group and $X^-$ is an anion. The filler slurries treated with such polymers are added to the paper stock in the production of filler-containing papers. The filler treatment is said to lead to improved drainage of the paper stock and result in an improvement in the various strength properties of the dried paper and an improvement in the filler retention.

US-A-2002/0088579 describes the pretreatment of inorganic fillers with cationic, anionic and amphoteric (zwitterionic) polymers. The treatment consists in each case of at least two stages. First the treatment with a cationic polymer and then the treatment with an anionic polymer are recommended. In further steps, further cationic and anionic polymers can be adsorbed again alternately. The aqueous suspensions containing the pretreated filler particles are added to the paper stock in the production of filler-containing paper. The filler treatment is said to lead to an improvement in various strength properties of the dried paper.

WO 00/59965 describes a polymer composition based on polymers having phosphonate and sulfonate groups and the use thereof in papermaking. The polymers may additionally contain monomers having amide groups incorporated in the form of polymerized units. The use of copolymers which contain N-vinylcarboxamides incorporated in the form of polymerized units and are subjected to a hydrolysis after the polymerization is not disclosed. The use of aqueous slurries of finely divided fillers which are at least partly coated with such polymers for papermaking is also not described.

Unpublished German Patent Application P 103 22 266.9 describes aqueous slurries of finely divided fillers which are at least partly coated with polymers and which are obtainable by treating aqueous slurries of finely divided fillers with at least one water-soluble amphoteric copolymer which is obtainable by copolymerization of a) at least one N-vinylcarboxamide of the formula

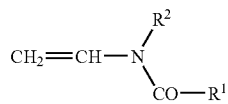
(III)

where $R^1$ and $R^2$ are H or $C_1$- to $C_6$-alkyl, b) at least one monoethylenically unsaturated carboxylic acid having 3 to 8 carbon atoms in the molecule and/or the alkali metal, alkaline earth metal or ammonium salts thereof and, if appropriate, c) other monoethylenically unsaturated monomers which are free of nitrile groups and, if appropriate, d) compounds which have at least two ethylenically unsaturated double bonds in the molecule, and subsequent partial or complete elimination of the —CO—$R^1$ groups from the monomers III incorporated in the form of polymerized units in the copolymer.

SUMMARY OF THE INVENTION

It is an object of the present invention to provide an aqueous composition comprising at least one finely divided filler and at least one water-soluble amphoteric copolymer, which composition can be used in papermaking. Paper products produced therewith should have good performance characteristics, especially good strength properties of the dried paper. These include especially good dry breaking lengths, dry pick resistances and/or good values with regard to the internal strength.

We have found that this object is achieved, surprisingly, by an aqueous composition which comprises at least one finely divided filler and at least one water-soluble amphoteric copolymer, the copolymer containing at least one monomer which is incorporated in the form of polymerized units and is selected from monoethylenically unsaturated sulfonic acids, phosphonic acids, phosphoric esters and derivatives thereof.

DETAILED DESCRIPTION OF THE PREFERRED EMBODIMENTS

The present invention therefore relates to an aqueous composition comprising at least one finely divided filler and at least one water-soluble amphoteric copolymer which is obtainable by copolymerization of a monomer mixture comprising a) at least one N-vinylcarboxamide of the formula I

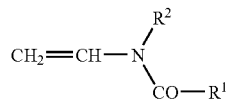
(I)

where $R^1$ and $R^2$, independently of one another, are H or $C_1$- to $C_6$-alkyl, b) at least one monomer which is selected from monoethylenically unsaturated sulfonic acids, phosphonic acids, phosphoric esters and derivatives thereof, c) if appropriate, at least one monomer which is selected from monoethylenically unsaturated mono- and dicarboxylic acids, the salts thereof and dicarboxylic anhydrides, d) if appropriate, at least one monoethylenically unsaturated monomer which differs from the components a) to c) and is free of nitrile groups, and e) if appropriate, at least one compound which has at least two ethylenically unsaturated double bonds in the molecule, with the proviso that the monomer mixture contains at least one monomer b) or c) having at least one free acid group and/or an acid group in salt form, and subsequent partial or complete hydrolysis of the —CO—$R^1$ groups from the monomers I incorporated in the form of polymerized units in the copolymer.

In the context of the present invention, the expression alkyl comprises straight-chain and branched alkyl groups. Suitable alkyl groups are, for example, $C_1$-$C_6$-alkyl and particularly preferably $C_1$-$C_4$-alkyl groups. These include in particular methyl, ethyl, propyl, isopropyl, n-butyl, 2-butyl, sec-butyl, tert-butyl, n-pentyl, 2-pentyl, 2-methylbutyl, 3-methylbutyl, 1,2-dimethylpropyl, 1,1-dimethylpropyl, 2,2-dimethylpropyl, 1-ethylpropyl, n-hexyl, 2-hexyl, 2-methylpentyl, 3-methylpentyl, 4-methylpentyl, 1,2-dimethylbutyl, 1,3-dimethylbutyl, 2,3-dimethylbutyl, 1,1-dimethylbutyl, 2,2-dimethylbutyl, 3,3-dimethylbutyl, 1,1,2-trimethylpropyl, 1,2,2-trimethylpropyl, 1-ethylbutyl, 2-ethylbutyl, 1-ethyl-2-methylpropyl, etc.

Below, compounds which are derived from acrylic acid and methacrylic acid may in some cases be abbreviated by inserting the syllable "(meth)" into the compound derived from acrylic acid.

Open-chain N-vinylamide compounds of the formula I) which are suitable as monomers a) are, for example, N-vinylformamide, N-vinyl-N-methylformamide, N-vinylacetamide, N-vinyl-N-methylacetamide, N-vinyl-N-ethylacetamide, N-vinylpropionamide, N-vinyl-N-methylpropionamide and N-vinylbutyramide and mixtures thereof.

Suitable monomers b) are compounds which have an organic radical having a polymerizable, α,β-ethylenically unsaturated double bond and one sulfonic or phosphonic acid group per molecule. The salts and esters of the abovementioned compounds are furthermore suitable. The esters of the phosphonic acids may be the monoesters or the diesters. Suitable monomers b) are furthermore monoesters of phosphoric acid with alcohols having a polymerizable, α,β-ethylenically unsaturated double bond. One or both remaining protons of the phosphoric acid group may be neutralized by suitable bases or esterified with alcohols which have no polymerizable double bonds.

Suitable bases for the partial or complete neutralization of the acid groups of the monomers b) are, for example, alkali metal or alkaline earth metal bases, ammonia, amines and/or alkanolamines. Examples of these are sodium hydroxide solution, potassium hydroxide solution, sodium carbonate, potassium carbonate, sodium bicarbonate, potassium bicarbonate, magnesium oxide, calcium hydroxide, calcium oxide, triethanolamine, ethanolamine, morpholine, diethylenetriamine or tetraethylenepentamine. Suitable alcohols for the preparation of the esters are, for example, $C_1$-$C_6$-alkanols, such as methanol, ethanol, n-propanol, isopropanol, n-butanol, sec-butanol, tert-butanol, etc.

The monomers b) include, for example, vinylsulfonic acid, allylsulfonic acid, methallylsulfonic acid, sulfoethyl acrylate, sulfoethyl methacrylate, sulfopropyl acrylate, sulfopropyl methacrylate, 2-hydroxy-3-acryloyloxypropylsulfonic acid, 2-hydroxy-3-methacryloyloxypropylsulfonic acid, styrenesulfonic acid, acrylamidomethylenephosphonic acid, 2-acrylamido-2-methylpropanesulfonic acid, vinylphosphonic acid, $CH_2=CH-NH-CH_2-PO_3H$, monomethyl vinylphosphonate, dimethyl vinylphosphonate, allylphosphonic acid, monomethyl allylphosphonate, dimethyl allylphosphonate, acrylamidomethylpropylphosphonic acid, (meth)acryloylethylene glycol phosphate, monovinyl phosphate, monoallyl phosphate, etc.

If exclusively monomers in which all protons of the acid groups have been esterified, e.g. dimethyl vinylphosphonate or dimethyl allylphosphonate, are used as component b), at least one monoethylenically unsaturated mono- and/or dicarboxylic acid or a salt thereof, as described below as component c), is used for the polymerization. It is thus ensured that the copolymers used according to the invention have anionogenic/anionic groups. Alternatively, the conditions for the hydrolysis can also be chosen so that some of the ester groups are also cleaved.

The abovementioned monomers b) may be used individually or in the form of any desired mixtures.

Suitable monomers c) are monoethylenically unsaturated carboxylic acids of 3 to 8 carbon atoms, the water-soluble salts of these carboxylic acids and monoethylenically unsaturated carboxylic anhydrides. These include, for example, acrylic acid, methacrylic acid, dimethacrylic acid, ethacrylic acid, α-chloroacrylic acid, crotonic acid, maleic acid, maleic anhydride, fumaric acid, itaconic acid, mesaconic acid, citraconic acid, glutaconic acid, aconitic acid, methylenemalonic acid, allylacetic acid and vinylacetic acid. The monomers of this group can be used alone or as a mixture with one another, in partly or in completely neutralized form, in the copolymerization. Bases suitable for the neutralization are those mentioned in the case of component b).

For the modification, the copolymers can, if appropriate, contain, incorporated in the form of polymerized units, at least one further monomer d) which is free of nitrile groups. These additional monomers d) are preferably selected from esters of α,β-ethylenically unsaturated mono- and dicarboxylic acids with $C_1$-$C_{30}$-alkanols, $C_2$-$C_{30}$-alkanediols and $C_2$-$C_{30}$-aminoalcohols, amides of α,β-ethylenically unsaturated monocarboxylic acids and the N-alkyl and N,N-dialkyl derivatives thereof, esters of vinyl alcohol and allyl alcohol with $C_1$-$C_{30}$-monocarboxylic acids, N-vinyllactams, nitrogen-containing heterocycles having α,β-ethylenically unsaturated double bonds, vinylaromatics, vinyl halides, vinylidene halides, $C_2$-$C_8$-monoolefins and mixtures thereof.

Suitable additional monomers d) are, for example, methyl (meth)acrylate, methyl ethacrylate, ethyl(meth)acrylate, ethyl ethacrylate, n-butyl(meth)acrylate, isobutyl(meth)acrylate, tert-butyl(meth)acrylate, tert-butyl ethacrylate, n-octyl (meth)acrylate, 1,1,3,3-tetramethylbutyl(meth)acrylate, ethylhexyl(meth)acrylate and mixtures thereof.

Suitable additional monomers d) are furthermore the esters of α,β-ethylenically unsaturated mono- and dicarboxylic acids with aminoalcohols, preferably $C_2$-$C_{12}$-aminoalcohols. These may be $C_1$-$C_8$-monoalkylated or $C_1$-$C_8$-dialkylated on the amine nitrogen. Suitable acid components of these esters are, for example, acrylic acid, methacrylic acid, fumaric acid, maleic acid, itaconic acid, crotonic acid, maleic anhydride, monobutyl maleate and mixtures thereof. Acrylic acid, methacrylic acid and mixtures thereof are preferably used. These include N-methylaminomethyl(meth)acrylate, N-methylaminoethyl(meth)acrylate, N,N-dimethylaminomethyl (meth)acrylate, N,N-dimethylaminoethyl(meth)acrylate, N,N-diethylaminoethyl(meth)acrylate, N,N-dimethylaminopropyl(meth)acrylate, N,N-diethylaminopropyl(meth)acrylate, N,N-dimethylaminocyclohexyl(meth)acrylate, etc.

Suitable additional monomers d) are furthermore acrylamide, methacrylamide, N-methyl(meth)acrylamide, N-ethyl (meth)acrylamide, N-propyl(meth)acrylamide, N-(n-butyl) (meth)acrylamide, tert-butyl(meth)acrylamide, n-octyl (meth)acrylamide, 1,1,3,3-tetramethylbutyl(meth) acrylamide, ethylhexyl(meth)acrylamide and mixtures thereof.

Suitable additional monomers d) are furthermore 2-hydroxyethyl acrylate, 2-hydroxyethyl methacrylate, 2-hydroxyethyl ethacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, 4-hydroxybutyl acrylate, 4-hydroxybutyl methacrylate, 6-hydroxyhexyl acrylate, 6-hydroxyhexyl methacrylate, etc.

Suitable additional monomers are furthermore N-[2-(dimethylamino)ethyl]acrylamide, N-[2-(dimethylamino)ethyl] methacrylamide, N-[3-(dimethylamino)propyl]acrylamide, N-[3-(dimethylamino)propyl]methacrylamide, N-[4-(dimethylamino)butyl]acrylamide, N-[4-(dimethylamino)butyl] methacrylamide N-[2-(diethylamino)ethyl]acrylamide, etc.

Suitable monomers d) are furthermore N-vinyllactams and derivatives thereof which may have, for example, one or more $C_1$-$C_6$-alkyl substituents, such as methyl, ethyl, n-propyl, isopropyl, n-butyl, sec-butyl, tert-butyl, etc. These include, for example, N-vinylpyrrolidone, N-vinylpiperidone, N-vinylcaprolactam, N-vinyl-5-methyl-2-pyrrolidone, N-vinyl-5-ethyl-2-pyrrolidone, N-vinyl-6-methyl-2-piperidone, N-vinyl-6-ethyl-2-piperidone, N-vinyl-7-methyl-2-caprolactam, N-vinyl-7-ethyl-2-caprolactam, etc.

Suitable monomers d) are furthermore N-vinylimidazoles, alkylvinylimidazoles, in particular methylvinylimidazoles, such as 1-vinyl-2-methylimidazole, 3-vinylimidazole N-oxide, 2- and 4-vinylpyridines, 2- and 4-vinylpyridine N-oxides and betaine derivatives and quaternization products of these monomers.

Suitable additional monomers are furthermore ethylene, propylene, isobutylene, butadiene, styrene, α-methylstyrene, vinyl chloride, vinylidene chloride, vinyl fluoride, vinylidene fluoride and mixtures thereof.

The abovementioned additional monomers d) may be used individually or in the form of any desired mixtures.

A further modification of the copolymers is possible by using in the copolymerization monomers e) which contain at least two double bonds in the molecule, e.g. methylenebisacrylamide, glycol diacrylate, glycol dimethacrylate, glyceryl triacrylate, pentaerythrityl triallyl ether, polyalkylene glycols or polyols, such as pentaerythritol, sorbitol or glucose, which are at least diesterified with acrylic acid and/or methacrylic acid. If at least one monomer of group (e) is used in the copolymerization, the amounts used are up to 2, e.g. from 0.001 to 1, mol %.

In a preferred embodiment, a monomer mixture is used for the polymerization, the component b) consisting only of monoethylenically unsaturated sulfonic acids and/or derivatives thereof or the component b) consisting only of monoethylenically unsaturated phosphonic acids, phosphoric esters and/or derivatives thereof.

The monomer mixture used for the polymerization preferably contains a combination of at least one compound of component b) and at least one compound of component c), in each case having a free acid group or an acid group in salt form. A preferred combination is, for example, vinylsulfonic acid or an alkali metal vinylsulfonate and acrylic acid. A further preferred combination is, for example, vinylphosphonic acid or an alkali metal vinylphosphonate and acrylic acid.

The water-soluble amphoteric copolymers used according to the invention are preferably obtainable by free radical copolymerization of from 1 to 99, preferably from 5 to 95, in particular from 20 to 90, % by weight, based on the total weight of the monomers used for the polymerization, of at least one compound of component a), from 1 to 99, preferably from 5 to 95, in particular from 10 to 80, % by weight, based on the total weight of the monomers used for the polymerization, of at least one compound of component b), from 0 to 80, preferably from 0.1 to 50, in particular from 1 to 40, % by weight, based on the total weight of the monomers used for the polymerization, of at least one compound of component c), from 0 to 30, preferably from 0.1 to 25, in particular from 1 to 15, % by weight, based on the total weight of the monomers used for the polymerization, of at least one compound of component d), from 0.0001 to 5, preferably from 0.001 to 3, % by weight, based on the total weight of the monomers used for the polymerization, of at least one compound of component e), and subsequent partial or complete hydrolysis of the monomers a) incorporated in the form of polymerized units in the copolymer.

The preparation of the water-soluble amphoteric polymers is effected by conventional processes known to a person skilled in the art. Suitable processes are described, for example, in EP-A-0 251 182 and WO 94/13882, which are hereby incorporated by reference.

The water-soluble amphoteric polymers can be prepared by solution, precipitation, suspension or emulsion polymerization. Solution polymerization in aqueous media is preferred. Suitable aqueous media are water and mixtures of water and at least one water-miscible solvent, for example an alcohol, such as methanol, ethanol, n-propanol, etc.

The polymerization temperatures are preferably from about 30 to 200° C., particularly preferably from 40 to 110° C. The polymerization is usually effected under atmospheric pressure but may also take place under reduced or superatmospheric pressure. A suitable pressure range is from 1 to 5 bar.

The monomers b) containing acid groups are preferably used in the salt form. For the copolymerization, the pH is preferably brought to a value of from 6 to 9. By use of a conventional buffer or by measurement of the pH and corresponding addition of acid or base, the pH can be kept constant during the polymerization.

For the preparation of the polymers, the monomers can be polymerized with the aid of free radical initiators.

As initiators for the free radical polymerization, it is possible to use the peroxo and/or azo compounds customary for this purpose, for example alkali metal or ammonium peroxodisulfates, diacetyl peroxide, dibenzoyl peroxide, succinyl peroxide, di-tert-butyl peroxide, tert-butyl perbenzoate, tert-butyl perpivalate, tert-butyl peroxy-2-ethylhexanoate, tert-butyl permaleate, cumene hydroperoxide, diisopropyl peroxodicarbamate, bis(o-toluoyl)peroxide, didecanoyl peroxide, dioctanoyl peroxide, dilauroyl peroxide, tert-butyl perisobutyrate, tert-butyl peracetate, di-tert-amyl peroxide, tert-butyl hydroperoxide, azobisisobutyronitrile, azobis(2-amidinopropane) dihydrochloride or 2,2'-azobis(2-methylbutyronitrile). Initiator mixtures or redox initiator systems, e.g. ascorbic acid/iron(II) sulfate/sodium peroxodisulfate, tert-butyl hydroperoxide/sodium disulfite, tert-butyl hydroperoxide/sodium hydroxymethanesulfinate, $H_2O_2/Cu^I$, are also suitable.

For establishing the molecular weight, the polymerization can be effected in the presence of at least one regulator. Regulators which may be used are the conventional compounds known to a person skilled in the art, for example sulfur compounds, e.g. mercaptoethanol, 2-ethylhexyl thioglycolate, thioglycolic acid or dodecyl mercaptan, and tribromochloromethane or other compounds which have a regulating effect on the molecular weight of the polymers obtained.

The molar masses of the water-soluble amphoteric polymers is, for example, at least 10 000, preferably at least 100 000, in particular at least 500 000, Dalton. The molar masses of the polymers are then, for example, from 10 000 to 10 million, preferably from 100 000 to 5 million (for example, determined by light scattering). This molar mass range corresponds, for example, to K values of from 5 to 300, preferably from 10 to 250 (determined according to H. Fikentscher in 5% strength aqueous sodium chloride solution at 25° C. and a polymer concentration of 0.5% by weight).

The hydrolysis of the polymers obtained by the process described above is effected by known methods, by the action of acids, bases or enzymes. As a result, the monomers incorporated in the form of polymerized units and of the above-mentioned formula I give, by elimination of the group

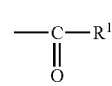

where $R^1$ has the meaning stated therefor in formula I, polymers which contain vinylamine units of the formula III

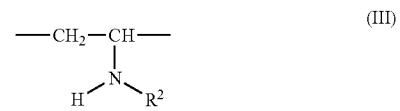

where $R^2$ has the meaning stated in formula I. With the use of acids as hydrolysis agents, the units III are present in the form of an ammonium salt. The copolymers thus also contain cationogenic/cationic groups in addition to the anionogenic/anionic groups introduced in the polymerization and are therefore amphoteric.

The copolymers may be hydrolyzed to an extent of from 0.1 to 100 mol %, e.g. from 70 to 100 mol %. In most cases, the degree of hydrolysis of the homo- and copolymers is from 1 to 98, preferably from 10 to 95, mol %. In addition, the copolymers may contain amidine units, which form, for example, by reaction of formic acid with two neighboring amino groups or by intramolecular reaction of an amino group with a neighboring amide group, for example of N-vinylformamide incorporated in the form of polymerized units.

The amidine units formed in the hydrolysis of vinylformamide units with acids or bases are of the formula IV

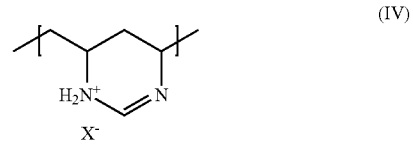

where $X^-$ is an anion.

Below, the sum of vinylamine and amidine units which form from the polymerized units of the N-vinylcarboxamides are always stated for the amphoteric copolymers.

The hydrolyzed copolymers contain, for example,
from 1 to 98, preferably from 1 to 75, mol % of vinylcarboxamide units,
from 1 to 98, preferably from 1 to 55, mol % of units of monoethylenically unsaturated sulfonic acids, phosphonic acids, phosphoric esters and derivatives thereof,
from 0 to 80, preferably from 0.1 to 45, mol % of units of monoethylenically unsaturated mono- and dicarboxylic acids, the salts thereof and dicarboxylic anhydrides,
from 1 to 98, preferably from 1 to 55, mol % of vinylamine and/or amidine units,
up to 30 mol % of units of other monoethylenically unsaturated compounds which are free of nitrile groups.

Particularly preferred hydrolyzed copolymers are those which contain
from 5 to 70 mol % of vinylcarboxamide units,
from 3 to 30 mol % of units of monoethylenically unsaturated sulfonic acids, phosphonic acids and salts thereof,
from 0 to 45 mol % of units of acrylic acid, methacrylic acid, salts and mixtures thereof,
from 10 to 50 mol % of vinylamine units in salt form and/or amidine units.

The novel aqueous compositions preferably contain from 1 to 50, particularly preferably from 10 to 40, % by weight of at least one finely divided filler. The amount of amphoteric water-soluble polymer is, for example, from 0.1 to 5, preferably from 0.25 to 3, % by weight, based on fillers.

The novel aqueous compositions are preferably present in the form of a slurry.

Suitable fillers are all pigments which can usually be used in the paper industry, e.g. calcium carbonate, which may be used in the form of ground calcium carbonate (GCC), chalk, marble or precipitated calcium carbonate (PCC), talc, kaolin, bentonite, satin white, calcium sulfate, barium sulfate and titanium dioxide. It is also possible to use mixtures of two or more pigments. The particle diameter of the finely divided fillers is, for example, such that from 40 to 90% of the particles are smaller than 2 μm.

The fillers are processed to give an aqueous slurry, for example by introduction into water. Precipitated calcium carbonate is usually suspended in water in the absence of dispersants. In order to prepare aqueous slurries of the other fillers, as a rule an anionic dispersant, e.g. a polyacrylic acid having an average molar mass Mw of, for example, from 1 000 to 40 000 Dalton, is used. If an anionic dispersant is used, for example, from 0.01 to 0.5, preferably from 0.2 to 0.3, % by weight thereof is used for the preparation of aqueous filler slurries. The finely divided fillers dispersed in water in the presence of anionic dispersants are anionic.

The aqueous slurries contain, for example, from 10 to 60, in general 20 to 50 (e.g. from 10 to 30, more specific 15 to 25), % by weight of at least one filler.

In specific cases, it is also possible to use pigments which were milled without dispersants or milling assistants. Such pigments (e.g. GCC) are milled as a rule at relatively low solids content and then used immediately after the milling as a filler in papermaking.

In order to prepare the novel aqueous slurries of finely divided fillers, aqueous slurries of finely divided fillers which may be anionically dispersed are treated with at least one water-soluble amphoteric polymer. For example, from 0.1 to 5% by weight, based on fillers, of a water-soluble amphoteric polymer can be added to an aqueous slurry containing from 1 to 50% by weight of at least one finely divided filler, or an aqueous slurry of a finely divided filler can be introduced into an aqueous solution of an amphoteric polymer and the components mixed in each case. The treatment of the aqueous slurry of finely divided fillers with the amphoteric polymers can be carried out continuously or batchwise. On combination of aqueous slurries of finely divided fillers and aqueous solutions of amphoteric polymers, the filler particles are at least partly coated or impregnated with the amphoteric polymers. The mixing of the components is effected, for example, in a shear field. In general, it is sufficient if the components are stirred after they have been combined or if they are treated in a shear field of an Ultraturrax apparatus. The combination and mixing of the components of the aqueous slurry can be effected, for example, at from 0 to 95° C., preferably from 10 to 70° C. In general, the components are mixed at the respective room temperature to a temperature of 40° C. The pH of the aqueous slurries of fillers which have been treated with amphoteric polymers is, for example, from 5 to 11, preferably from 6 to 9, the pH of calcium carbonate-containing slurries preferably being more than 6.5.

The copolymers used according to the invention have a relatively large number of ionically dissociable/dissociated groups of opposite chargeability/charge which are bonded to the polymer chain. When brought into contact with aqueous slurries of finely divided fillers, Coulomb interactions may occur. Thus, when brought into contact, at least partial occupation of the surface of the polymer particles occurs. This can be detected, for example, by transmission electron microscopy (TEM). The surface charge may additionally be measured by zeta potential measurements which show that the charge is on the outside. The electrophoretic mobility and the zeta potential can be determined by a laser optical method. The measuring instrument used is, for example, a Zetasizer 3000 HS from Malvern Instruments Ltd.

The amphoteric copolymers may carry an excess anionic or an excess cationic charge or may be electrically neutral if equal numbers of anionic and cationic groups are present in the copolymer. Depending on the charged state of the amphoteric copolymers, the aqueous slurries of the fillers which are prepared therewith are anionic, cationic or electrically neutral if the amphoteric copolymers have the same quantity of cationic and anionic charge.

Those amphoteric copolymers which have a charge density of, preferably, not more than 1 meq/g at pH 7 both in the anionic and in the cationic range are preferably used.

The present invention furthermore relates to the use of the aqueous compositions described above as an additive for the paper stock in the production of filler-containing paper, filler-containing cardboard or filler-containing board by draining the paper stock.

The present invention is explained in more detail by the following, nonlimiting examples.

EXAMPLES

1.) Methods of Analysis

The K values of the copolymers were determined according to H. Fikentscher, Cellulosechemie 13 (1932), 48-64 and 71-74, in 1.0% aqueous sodium chloride solution at 25° C. at a pH of 7 and a polymer concentration of 0.1% by weight.

The degree of hydrolysis of the polymers can be determined by enzymatic analysis of the formic acid/formates liberated in the hydrolysis.

The structural composition of the polymer was calculated from the monomer mixture used, the degree of hydrolysis and the vinylamine/amidine ratio determined by means of $^{13}$C-NMR spectroscopy. For this purpose, the ratio of the integrals of the two following signals were evaluated:

| Group | Position of the signal [ppm] | Area |
|---|---|---|
| HCOO⁻ | 173 | A (formate) |
| —N=CH—N— | 152 | A (amidine) |

2.) Preparation of the Polymers

Example 1

In a 2 l glass apparatus having an anchor stirrer, reflux condenser, internal thermometer and nitrogen inlet tube, 1 339.0 g of distilled water, 3.8 g of 75% strength phosphoric acid, 202.0 g of 25% sodium vinylsulfonate solution in water and 69.9 g of acrylic acid are mixed at a speed of 100 rpm. By dropwise addition of about 84 g of a 50% strength aqueous sodium hydroxide solution, the pH is brought to 7.0. 181.4 g of vinylformamide are then added. While passing in nitrogen, the mixture is heated to 60° C. After the temperature has been reached, 20.0 g of a 1.5% strength aqueous solution of 2,2'-azobis(2-methylpropionamidine) dihydrochloride are added in the course of 5 minutes. A further 81.5 g of a 1.5% strength aqueous solution of 2,2'-azobis(2-methylpropionamidine)dihydrochloride are added in the course of 4 hours. After a polymerization time of 3 hours, the temperature is increased to 75° C. After a further hour at 75° C., 0.75 g of 2,2'-azobis(2-methylpropionamidine) dihydrochloride in 20.0 g of distilled water is added and polymerization is continued for 2 hours at 75° C. After cooling to room temperature, a slightly turbid, colorless, highly viscous solution having a solids content of 18.4% is obtained. The K value of the terpolymer is 128.

500.0 g of the above product are heated to 80° C. in a 1 l four-necked flask having a paddle stirrer, internal thermometer, dropping funnel and reflux condenser at a stirrer speed of 80 rpm. First 6.3 g of a 40% strength aqueous sodium disulfite solution and then 33.3 g of a 25% strength aqueous sodium hydroxide solution are added so that they mix in thoroughly. The reaction mixture is kept at 80° C. for 4.5 hours and then cooled to room temperature. By slow addition of about 17.2 g of concentrated hydrochloric acid, the pH is brought to 7, and then 234.0 g of distilled water are added for dilution. After cooling to room temperature, a viscous, colorless, slightly turbid solution having a solids content of 13.5% is obtained. The degree of hydrolysis is 38% (based on VFA).

The polymer I obtained has the following structural units:

| | |
|---|---|
| vinylformamide: | 35 mol % |
| vinylamine and amidine: | 27 mol % |
| sodium vinylsulfonate: | 11 mol % |
| sodium acrylate: | 27 mol % |

Example 2

In a 2 l glass apparatus having an anchor stirrer, reflux condenser, internal thermometer and nitrogen inlet tube, 1 339.0 g of distilled water, 3.8 g of 75% strength phosphoric acid, 202.0 g of 25% sodium vinylsulfonate solution in water and 69.9 g of acrylic acid are mixed at a speed of 100 rpm. By dropwise addition of about 84 g of a 50% strength aqueous sodium hydroxide solution, the pH is brought to 6.8. 181.4 g of vinylformamide are then added. While passing in nitrogen, the mixture is heated to 62° C. After the temperature has been reached, 20.0 g of a 1.5% strength aqueous solution of 2,2'-azobis(2-methylpropionamidine) dihydrochloride are added in the course of 5 minutes. A further 81.5 g of a 1.5% strength aqueous solution of 2,2'-azobis(2-methylpropionamidine)dihydrochloride are added in the course of 4 hours. After a polymerization time of 3 hours, the temperature is increased to 75° C. After a further hour at 75° C., 0.75 g of 2,2'-azobis(2-methylpropionamidine) dihydrochloride in 20.0 g of distilled water is added and polymerization is continued for 2 hours at 75° C. After cooling to room temperature, a slightly turbid, colorless, highly viscous solution having a solids content of 18.6% is obtained. The K value of the terpolymer is 122.

500.0 g of the above product are heated to 80° C. in a 1 l three-necked flask having a paddle stirrer, internal thermometer, dropping funnel and reflux condenser at a stirrer speed of 80 rpm. First 6.3 g of a 25% strength aqueous sodium disulfite solution and then 60.5 g of a 25% strength aqueous sodium hydroxide solution are added so that they mix in thoroughly. The reaction mixture is kept at 80° C. for 3 hours and then cooled to room temperature. By slow addition of about 31 g of concentrated hydrochloric acid, the pH is brought to 7.2, and then 234.0 g of distilled water are added for dilution. After cooling to room temperature, a viscous, colorless, slightly turbid solution having a solids content of 15.0% is obtained. The degree of hydrolysis is 59% (based on VFA).

The polymer II obtained has the following structural units:

| | |
|---|---|
| vinylformamide: | 18 mol % |
| vinylamine and amidine: | 43 mol % |
| sodium vinylsulfonate: | 11 mol % |
| sodium acrylate: | 28 mol % |

Example 3

In a 2 l glass apparatus having an anchor stirrer, reflux condenser, internal thermometer and nitrogen inlet tube, 345.0 g of distilled water, 3.8 g of 75% strength phosphoric acid, 202.0 g of 25% sodium vinylsulfonate solution in water and 69.9 g of acrylic acid are mixed at a speed of 100 rpm. By dropwise addition of about 82 g of a 50% strength aqueous sodium hydroxide solution, the pH is brought to 6.8. 181.4 g of vinylformamide are then added. While passing in nitrogen, the mixture is heated to 55° C. After the temperature has been reached, 20.0 g of a 1.5% strength aqueous solution of 2,2'-azobis(2-methylpropionamidine) dihydrochloride are added in the course of 5 minutes. A further 51.5 g of a 1.5% strength aqueous solution of 2,2'-azobis(2-methylpropionamidine)dihydrochloride are added in the course of 3 hours. After a polymerization time of 1 hour, 200.0 g of distilled water are added for dilution. After a polymerization time of 2 hours, a further 200.0 g of distilled water are added for dilution. After 3 hours, 30.0 g of a 1.5% strength aqueous solution of 2,2'-azobis(2-methylpropionamidine) dihydrochloride have added to them 0.8 g of 2,2'-azobis(2-methylpropionamidine) dihydrochloride and the temperature is increased to 75° C. for 2 hours. Dilution is then effected with a further 600.0 g of distilled water. After cooling to room temperature, a slightly turbid, colorless, highly viscous solution having a solids content of 18.4% is obtained. The K value of the terpolymer is 145.

500.0 g of the above product are heated to 80° C. in a 1 l four-necked flask having a paddle stirrer, internal thermometer, dropping funnel and reflux condenser at a stirrer speed of 80 rpm. 200 g of distilled water, 6.3 g of a 40% strength aqueous sodium disulfite solution and then 35.2 g of a 25% strength aqueous sodium hydroxide solution are added so that they mix in thoroughly. The reaction mixture is kept at 80° C. for 3 hours and then cooled to room temperature. By slow addition of about 17 g of concentrated hydrochloric acid, the pH is brought to 7.9, and then 42.8 g of distilled water are added for dilution. After cooling to room temperature, a viscous, colorless, slightly turbid solution having a solids content of 13.3% is obtained. The degree of hydrolysis is 37% (based on VFA).

The polymer III obtained has the following structural units:

| | |
|---|---|
| vinylformamide: | 36 mol % |
| vinylamine and amidine: | 26 mol % |
| sodium vinylsulfonate: | 11 mol % |
| sodium acrylate: | 27 mol % |

Example 4

In a 2 l glass apparatus having an anchor stirrer, reflux condenser, internal thermometer and nitrogen inlet tube, 25.0 g of distilled water, 1.6 g of 75% strength phosphoric acid and 442.9 g of 25% sodium vinylsulfonate solution in water are mixed at a speed of 100 rpm. By dropwise addition of about 15.2 g of a 50% strength aqueous sodium hydroxide solution, the pH is brought to 6.5. 181.4 g of vinylformamide are then added. While passing in nitrogen, the mixture is heated to 50° C. After the temperature has been reached, 14.0 g of a 1.5% strength aqueous solution of 2,2'-azobis(2-methylpropiona-midine)dihydrochloride are added in the course of 5 minutes. A further 56.0 g of a 1.5% strength aqueous solution of 2,2'-azobis(2-methyl-propionamidine) dihydrochloride are added in the course of 4 hours. After the end of the addition, the reaction mixture is kept at 50° C. for a further 4 hours. Thereafter, 0.2 g of 2,2'-azobis(2-methylpropionamidine) dihydrochloride in 20 g of distilled water is added and the temperature is kept at 50° C. for a further 3 hours. The temperature is then increased to 75° C. for 2 hours. The solution obtained is diluted with 250.0 g of distilled water and cooled to room temperature.

A clear, yellowish, viscous solution having a solids content of 29.6% is obtained. The K value of the copolymer is 81.

360 g of the above product are heated to 80° C. in a 1 l three-necked flask having a paddle stirrer, internal thermometer, dropping funnel and reflux condenser at a stirrer speed of 80 rpm. First 4.5 g of a 40% strength aqueous sodium disulfite solution and then 48.1 g of a 25% strength aqueous sodium hydroxide solution are added so that they mix in thoroughly. The reaction mixture is kept at 80° C. for 3.5 hours and then cooled to room temperature. By slow addition of about 23 g of concentrated hydrochloric acid, the pH is brought to 7.6. A viscous, yellow, clear solution having a solids content of 28.5% is obtained. The degree of hydrolysis is 31% (based on VFA).

The polymer IV obtained has the following structural units:

| | |
|---|---|
| vinylformamide: | 48 mol % |
| vinylamine and amidine: | 25 mol % |
| sodium vinylsulfonate: | 27 mol % |

Example 5

In a 2 l glass apparatus having an anchor stirrer, reflux condenser, internal thermometer and nitrogen inlet tube, 733.3 g of distilled water, 1.6 g of 75% strength phosphoric acid, 11.7 g of vinylphosphonic acid (95%) and 44.3 g of acrylic acid are mixed at a speed of 100 rpm. By dropwise addition of about 63 g of a 50% strength aqueous sodium hydroxide solution, the pH is brought to 6.7. 95.6 g of vinylformamide are then added. While passing in nitrogen, the mixture is heated to 70° C. After the temperature has been reached, 10.0 g of a 1.5% strength aqueous solution of 2,2'-azobis(2-methylpropionamidine)dihydrochloride are added in the course of 5 minutes. A further 41.0 g of a 1.5% strength aqueous solution of 2,2'-azobis(2-methylpropionamidine) dihydrochloride are added in the course of 4 hours. After the end of the feed, the temperature is increased to 75° C. and 0.45 of 2,2'-azobis(2-methylpropionamidine) dihydrochloride in 20 g of distilled water is added. After a further 2 hours at 75° C., the polymerization is complete and the product is cooled to room temperature. A slightly turbid, colorless, viscous solution having a solids content of 13.7% is obtained. The K value of the terpolymer is 125.

500.0 g of the above product are heated to 80° C. in a 1 l three-necked flask having a paddle stirrer, internal thermometer, dropping funnel and reflux condenser at a stirrer speed of 80 rpm. First 6.3 g of a 40% strength aqueous sodium disulfite solution and then 27.7 g of a 25% strength aqueous sodium hydroxide solution are added so that they mix in thoroughly. The reaction mixture is kept at 80° C. for 4 hours and then cooled to room temperature. By slow addition of about 17 g of concentrated hydrochloric acid, the pH is brought to 7.5, and then 250.0 g of distilled water are added for dilution. After cooling to room temperature, a viscous, colorless, clear solution having a solids content of 12.4% is obtained. The degree of hydrolysis is 25% (based on VFA).

The polymer V obtained has the following structural units:

| | |
|---|---|
| vinylformamide: | 46 mol % |
| vinylamine and amidine: | 17 mol % |
| sodium vinylphosphonate: | 5 mol % |
| sodium acrylate: | 32 mol % |

Example 6

In a 2 l glass apparatus having an anchor stirrer, reflux condenser, internal thermometer and nitrogen inlet tube, 200.0 g of distilled water, 3.7 g of 75% strength phosphoric acid, 32.1 g of vinylphosphonic acid (95%) and 30.5 g of acrylic acid in water are mixed at a speed of 100 rpm. By dropwise addition of about 59 g of a 50% strength aqueous sodium hydroxide solution, the pH is brought to 6.5. 150.0 g of vinylformamide are then added. While passing in nitrogen, the mixture is heated to 50° C. After the temperature has been reached, 14.0 g of a 1.5% strength aqueous solution of 2,2'-azobis(2-methylpropionamidine) dihydrochloride are added in the course of 5 minutes. A further 53.0 g of a 1.5% strength aqueous solution of 2,2'-azobis(2-methylpropionamidine)dihydrochloride are added in the course of 4 hours. After the end of the addition, the reaction mixture is kept at 50° C. for a further 4 hours. Thereafter, 0.25 g of 2,2'-azobis(2-methyl-propionamidine) dihydrochloride in 20.0 g of distilled water is added and the temperature is kept at 50° C. for a further 3 hours. The temperature is then increased to 75° C. for 2 hours. The solution obtained is diluted with 250.0 g of distilled water and cooled to room temperature.

A slightly turbid, colorless, viscous solution having a solids content of 30.1% is obtained. The K value of the terpolymer is 85.

400 g of the above product are heated to 80° C. in a 1 l three-necked flask having a paddle stirrer, internal thermometer, dropping funnel and reflux condenser at a stirrer speed of 80 rpm. First 5.0 g of a 40% strength aqueous sodium disulfite solution and then 50.9 g of a 25% strength aqueous sodium hydroxide solution are added so that they mix in thoroughly. The reaction mixture is kept at 80° C. for 3 hours and then cooled to room temperature. By slow addition of about 29 g of concentrated hydrochloric acid, the pH is brought to 7.5.

A viscous, colorless, slightly turbid solution having a solids content of 29.0% is obtained. The degree of hydrolysis is 27% (based on VFA).

The polymer VI obtained has the following structural units:

| | |
|---|---|
| vinylformamide: | 52 mol % |
| vinylamine and amidine: | 21 mol % |
| sodium vinylphosphonate: | 11 mol % |
| sodium acrylate: | 16 mol % |

3.) Treatment of Fillers

Example 7

5.4 g of a 13.5% strength aqueous solution of an amphoteric copolymer from example 1 were initially taken in a beaker and then diluted with 30 g of drinking water. 150 g of a 20% strength slurry of precipitated calcium carbonate (PCC) in water were then added. During the addition of the slurry and thereafter, the mixture was stirred with the aid of a Heiltof stirrer at 1 000 revolutions per minute (rpm). The pH of the mixture was then brought to 8.5. With the aid of microelectrophoresis, the mobility of the filler particles at pH 8.5 and at pH 7 was measured. The electrophoretic mobility assumes a slightly negative value at both pH settings.

Example 8

4.8 g of a 15% strength aqueous solution of an amphoteric copolymer from example 2 were initially taken in a beaker and then diluted with 30 g of drinking water. 150 g of a 20% strength slurry of precipitated calcium carbonate (PCC) in water were then added. During the addition of the slurry and thereafter, the mixture was stirred with the aid of a Heiltof stirrer at 1 000 revolutions per minute (rpm). The pH of the mixture was then brought to 8.5. With the aid of microelectrophoresis, the mobility of the filler particles at pH 8.5 and at pH 7 was measured. The electrophoretic mobility assumes a slightly negative value at both pH settings.

Example 9

5.4 g of a 13.3% strength aqueous solution of an amphoteric copolymer from example 3 were initially taken in a beaker and then diluted with 30 g of drinking water. 150 g of a 20% strength slurry of precipitated calcium carbonate (PCC) in water were then added. During the addition of the slurry and thereafter, the mixture was stirred with the aid of a Heiltof stirrer at 1 000 revolutions per minute (rpm). The pH of the mixture was then brought to 8.5. With the aid of microelectrophoresis, the mobility of the filler particles at pH 8.5 and at pH 7 was measured. The electrophoretic mobility assumes a slightly negative value at both pH settings.

Example 10

2.5 g of a 28.5% strength aqueous solution of an amphoteric copolymer from example 4 were initially taken in a beaker and then diluted with 30 g of drinking water. 150 g of a 20% strength slurry of precipitated calcium carbonate (PCC) in water were then added. During the addition of the slurry and thereafter, the mixture was stirred with the aid of a Heiltof stirrer at 1 000 revolutions per minute (rpm). The pH of the mixture was then brought to 8.5. With the aid of microelectrophoresis, the mobility of the filler particles at pH 8.5 and at pH 7 was measured. The electrophoretic mobility assumes a slightly negative value at both pH settings.

Example 11

5.8 g of a 12.4% strength aqueous solution of an amphoteric copolymer from example 5 were initially taken in a beaker and then diluted with 30 g of drinking water. 150 g of a 20% strength slurry of precipitated calcium carbonate (PCC) in water were then added. During the addition of the slurry and thereafter, the mixture was stirred with the aid of a Heiltof stirrer at 1 000 revolutions per minute (rpm). The pH of the mixture was then brought to 8.5. With the aid of microelectrophoresis, the mobility of the filler particles at pH 8.5 and at pH 7 was measured. The electrophoretic mobility assumes a substantially negative value at both pH settings.

Example 12

2.5 g of a 29% strength aqueous solution of an amphoteric copolymer from example 6 were initially taken in a beaker and then diluted with 30 g of drinking water. 150 g of a 20% strength slurry of precipitated calcium carbonate (PCC) in water were then added. During the addition of the slurry and thereafter, the mixture was stirred with the aid of a Heiltof stirrer at 1 000 revolutions per minute (rpm). The pH of the mixture was then brought to 8.5. With the aid of microelectrophoresis, the mobility of the filler particles at pH 8.5 and at pH 7 was measured. The electrophoretic mobility assumes a slightly negative value at both pH settings.

Example 13

5.4 g of a 13.5% strength aqueous solution of an amphoteric copolymer from example 1 were initially taken in a beaker and then diluted with 30 g of drinking water. 150 g of a 20% strength slurry of ground calcium carbonate (GCC) in water were then added. During the addition of the slurry and thereafter, the mixture was stirred with the aid of a Heiltof stirrer at 1 000 revolutions per minute (rpm). The pH of the mixture was then brought to 8.5. With the aid of microelectrophoresis, the mobility of the filler particles at pH 8.5 and at pH 7 was measured. The electrophoretic mobility assumes a slightly negative value at both pH settings.

Example 13a 5.4 g of a 13.5% strength aqueous solution of an amphoteric copolymer from example 1 were initially taken in a beaker and then diluted with 30 g of water. 150 g of a 20% strength slurry of ground calcium carbonate (GCC) in water were then added. The addition of the GCC slurry is effected here immediately after the end of the milling process in a laboratory pigment mill. The milling took place in the presence of a dispersant based on polyacrylic acid. As a result of the milling, it was found that about 75% of the GCC particles have a particle size of <2 μm. During the addition of the GCC slurry and thereafter, the mixture was stirred with the aid of a Heiltof stirrer at 1000 revolutions per minute (rpm). The pH of the mixture was then brought to 8.5. With the aid of microelectrophoresis, the mobility of the filler particles at pH 8.5 and at pH 7 was measured. The electrophoretic mobility assumed a slightly negative value at both pH settings.

Example 13b 5.4 g of an aqueous solution of an amphoteric copolymer from example 1 were initially taken in a beaker and then diluted with 30 g of water. 150 g of a 20% strength slurry of ground calcium carbonate (GCC) in water were then added. The addition of the GCC slurry is effected here immediately after the end of the milling process in a laboratory pigment mill. In contrast to Example 13a, no dispersant was used in the pigment milling. As a result of the milling, it was found that about 60% of the GCC particles have a particle size of <2 μm. During the addition of the GCC slurry and thereafter, the mixture was stirred with the aid of a Heiltof stirrer at 1000 revolutions per minute (rpm). The pH of the mixture was then brought to 8.5. With the aid of microelectrophoresis, the mobility of the filler particles at pH 8.5 and at pH 7 was measured. The electrophoretic mobility assumed a slightly negative value at both pH settings.

COMPARATIVE EXAMPLE

According to JP4080597 40A 6 g of a 12% strength aqueous solution of an amphoteric copolymer from example 1 in JP4080597 40A were initially taken in a beaker and then diluted with 30 g of drinking water. 150 g of a 20% strength slurry of precipitated calcium carbonate (PCC) in water were then added. During the addition of the slurry and thereafter, the mixture was stirred with the aid of a Heiltof stirrer at 1 000 revolutions per minute (rpm). The pH of the mixture was then brought to 8.5. With the aid of microelectrophoresis, the mobility of the filler particles at pH 8.5 and at pH 7 was measured. The electrophoretic mobility assumes a slightly negative value at both pH settings.
4.) Preparation of Filler-Containing Paper
Paper Type "A"

Examples 14 to 20

A mixture of TMP (thermomechanical pulp) and groundwood was beaten in the ratio of 70/30 at a solids concentration of 4% in a laboratory pulper until free of specks and until the freeness of 60-65 was reached. The pH of the stock was then from 7 to 8. The beaten stock was then diluted with drinking water to a solids concentration of 0.35%.

In order to determine the behavior of the aqueous filler slurries described above in the production of filler-containing paper, in each case 500 ml of the paper stock suspension were initially taken in and in each case the slurries treated according to the examples and the comparative examples and a cationic retention aid (Polymin KE 2020) were metered in. The dosage of the retention aid was in each case 0.01%, based on dry content of the paper stock suspension, of polymer. The amount of slurry was established with the aid of a plurality of preliminary experiments so that the ash content of the paper sheets produced using the stock was 32%. Moreover, sheets were produced using the 20% strength aqueous slurries of precipitated calcium carbonate (PCC slurry) and ground calcium carbonate (GCC slurry) shown in table 1.

The paper sheets were produced in each case on a Rapid-Köthen sheet former according to ISO 5269/2 with a sheet weight of 80 g/m², and then dried for 7 minutes at 90° C. and then calendered with a nip pressure of 200 N/cm.
Papers of Type "B"

Examples 21 to 27

A mixture of bleached birch sulfate and bleached pine sulfite was beaten in the ratio of 70/30 at a solids concentration of 4% in a laboratory pulper until free of specks and until a freeness of 55-60 was reached. An optical brightener (Blankophor PSG from Ciba) and a cationic starch (HiCat 5163 A from Roquette) were then added to the beaten stock. The digestion of the cationic starch takes place as a 10% strength starch slurry in a jet cooker at 130° C. in a residence time of 1 minute. The dosage of the optical brightener was 0.5%, based on dry content of the paper stock suspension, of commercial product. The dosage of the cationic starch was 0.5%, based on the dry content of the paper stock suspension, of starch. The pH of the stock was then from 7 to 8. The beaten stock was then diluted with drinking water to a solids concentration of 0.35%.

In order to determine the behavior of the aqueous filler slurries described above in the production of filler-containing paper, in each case 500 ml of the paper stock suspension were initially taken and in each case the slurries treated according to the examples and the comparative examples and a cationic retention aid (Polymin KE 2020) were metered in. The dosage of the retention aid was in each case 0.01%, based on dry content of the paper stock suspension, of polymer. The amount of slurry was established with the aid of a plurality of preliminary experiments so that the ash content of the paper sheets produced using the stock was 20%. Moreover, sheets were produced using the 20% strength aqueous slurries of precipitated calcium carbonate (PCC slurry) and ground calcium carbonate (GCC slurry) shown in table 2.

The paper sheets were produced in each case on a Rapid-Köthen sheet former according to ISO 5269/2 with a sheet weight of 80 g/m² and then dried for 7 minutes at 90° C.
Testing of the Paper Sheets of Type "A"

After a storage time in a conditioned chamber at a constant 23° C. and 50% atmospheric humidity for 12 hours, the dry breaking length of the sheets according to DIN 54540 and the porosity of the sheets according to Bendtsen (ISO 5636-3) were tested. The dry pick resistance was determined using the IGT printability tester (ISO 3783). The results are shown in table 1.
Testing of the Paper Sheets of Type "B"

After a storage time in a conditioned chamber at a constant 23° C. and 50% atmospheric humidity for 12 hours, the dry breaking length of the sheets according to DIN 54540, the internal strength (Scott Bond) according to DIN 54516 and the CIE whiteness according to DIN 5033 were determined. The results are shown in table 2.

TABLE 1

| Ex. | Slurry from example | Dry breaking length (m) | Porosity (ml/min) | IGT |
|---|---|---|---|---|
| 14 | Example 7 | 2418 | 1666 | very good |
| 15 | Example 8 | 2276 | 1754 | very good |
| 16 | Example 9 | 2313 | 1709 | very good |
| 17 | Example 10 | 2086 | 1698 | good |
| 18 | Example 11 | 2247 | 1639 | very good |
| 19 | Example 12 | 2097 | 1756 | very good |
| 20 | Example 13 | 2339 | 1526 | very good |

TABLE 1-continued

| Ex. | Slurry from example | Dry breaking length (m) | Porosity (ml/min) | IGT |
|---|---|---|---|---|
| Comparative examples | | | | |
| PCC slurry without pretreatment | | 1667 | 1774 | poor |
| GCC slurry without pretreatment | | 1739 | 1736 | poor |
| Comparative example 1 | | 1978 | 1699 | moderate |

TABLE 2

| Ex. | Slurry from example | Dry breaking length (m) | CIE whiteness | Scott bond (m/kg) |
|---|---|---|---|---|
| 21 | Example 7 | 4245 | 113.8 | 24.3 |
| 22 | Example 8 | 4187 | 113.1 | 22.9 |
| 23 | Example 9 | 4034 | 113.7 | 22.2 |
| 24 | Example 10 | 3934 | 112.6 | 20.4 |
| 25 | Example 11 | 4197 | 112.3 | 23.7 |
| 26 | Example 12 | 3912 | 112.1 | 21.4 |
| 27 | Example 13 | 4183 | 119.6 | 22.1 |
| 28 | Example 13a | 4252 | 118.9 | 23.9 |
| 29 | Example 13b | 4701 | 119.1 | 28.3 |
| Comparative examples | | | | |
| PCC slurry without pretreatment | | 3354 | 110.7 | 15.6 |
| GCC slurry without pretreatment | | 3268 | 119.4 | 15.2 |
| Comparative example 1 | | 3754 | 111.8 | 17.2 |

Obviously, numerous modifications and variations of the present invention are possible in light of the above teachings. It is therefore to be understood that within the scope of the appended claims, the invention may be practiced otherwise than as specifically described herein.

The invention claimed is:

1. An aqueous slurry composition comprising at least one finely divided filler and at least one water-soluble amphoteric copolymer which is obtained by copolymerization of a monomer mixture consisting of
a) at least one N-vinylcarboxamide of the formula I

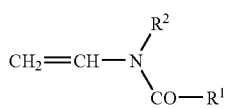

(I)

where $R^1$ and $R^2$, independently of one another, are H or $C_1$- to $C_6$-alkyl,
b) at least one monomer which is selected from monoethylenically unsaturated sulfonic acids, phosphonic acids, phosphoric esters and derivatives thereof,
c) optionally, but subject to the below proviso, at least one monomer which is selected from monoethylenically unsaturated mono- and dicarboxylic acids, the salts thereof and dicarboxylic anhydrides,
d) optionally, at least one monoethylenically unsaturated monomer which is free of nitrile groups and is selected from the group consisting of esters of α,β-ethylenically unsaturated mono- and dicarboxylic acids with $C_1$-$C_{30}$-alkanols, $C_2$-$C_{30}$-alkanediols and $C_2$-$C_{30}$-aminoalcohols, amides of α,β-ethylenically unsaturated monocarboxylic acids and the N-alkyl and N,N-dialkyl derivatives thereof, esters of vinyl alcohol and allyl alcohol with $C_1$-$C_{30}$-monocarboxylic acids, N-vinyllactams, nitrogen-containing heterocycles having α,β-ethylenically unsaturated double bonds, vinylaromatics, vinyl halides, vinylidene halides, $C_2$-$C_8$-monoolefins, and
e) optionally, at least one compound which has at least two ethylenically unsaturated double bonds in the molecule,
with the proviso that the monomer mixture contains at least one monomer b) or c) having at least one free acid group and/or an acid group in salt form,
and subsequent partial or complete hydrolysis of the —CO—$R^1$ groups from the monomers of formula I incorporated in the form of polymerized units in the copolymer.

2. A composition according to claim 1, wherein N-vinylformamide is used as component a).

3. A composition according to claim 1, wherein component b) is selected from the group consisting of vinylsulfonic acid, allylsulfonic acid, methallylsulfonic acid, sulfoethyl acrylate, sulfoethyl methacrylate, sulfopropyl acrylate, sulfopropyl methacrylate, 2-hydroxy-3-acryloyloxypropylsulfonic acid, 2-hydroxy-3-methacryloyloxypropylsulfonic acid, styrenesulfonic acid, acrylamidomethylenephosphonic acid, 2-acrylamido-2-methylpropanesulfonic acid, vinylphosphonic acid, $CH_2=CH-NH-CH_2-PO_3H$, monomethyl vinylphosphonate, dimethyl vinylphosphonate, allylphosphonic acid, monomethyl allylphosphonate, dimethyl allylphosphonate, acrylamidomethylpropylphosphonic acid, (meth)acryloylethylene glycol phosphate, monovinyl phosphate, monoallyl phosphate, the salts of the abovementioned acids and mixtures thereof.

4. A composition according to claim 1, wherein the monomer mixture used for the polymerization contains at least one compound of component b) and at least one compound of component c), in each case having a free acid group or an acid group in salt form.

5. A composition according to claim 1, wherein the hydrolyzed copolymers contain
from 1 to 98 mol % of vinylcarboxamide units,
from 1 to 98 mol % of units of monoethylenically unsaturated sulfonic acids, phosphonic acids, phosphoric esters and derivatives thereof,
from 0 to 80 mol % of units of monoethylenically unsaturated mono- and dicarboxylic acids, the salts thereof and dicarboxylic anhydrides,
from 1 to 98 mol % of vinylamine and/or amidine units,
up to 30 mol % of units of other monoethylenically unsaturated compounds which are free of nitrile groups.

6. A composition according to claim 1, wherein the hydrolyzed copolymers contain
from 5 to 70 mol % of vinylcarboxamide units,
from 3 to 30 mol % of units of monoethylenically unsaturated sulfonic acids, phosphonic acids and salts thereof,
from 0 to 45 mol % of units of acrylic acid, methacrylic acid, salts and mixtures thereof,
from 10 to 50 mol % of vinylamine units in salt form and/or amidine units.

7. A composition according to claim 1, which contains from 1 to 50% by weight of at least one finely divided filler.

8. A composition according to claim 1, which contains from 0.1 to 5% by weight, based on fillers, of amphoteric water-soluble copolymers.

9. A composition according to claim 1, wherein the amphoteric copolymers have an excess anionic or cationic charge or the same quantity of cationic and anionic charge.

10. A composition according to claim 1, wherein the hydrolyzed copolymers contain from 1 to 75 mol % of vinylcarboxamide units,
from 1 to 55 mol % of units of monoethylenically unsaturated sulfonic acids, phosphonic acids, phosphoric esters and derivatives thereof,
from 0.1 to 45 mol % of units of monoethylenically unsaturated mono- and dicarboxylic acids, the salts thereof and dicarboxylic anhydrides,
from 1 to 55, mol % of vinylamine and/or amidine units,
up to 30 mol % of units of other monoethylenically unsaturated compounds which are free of nitrile groups.

11. A composition according to claim 1, which contains from 10 to 40% by weight of at least one finely divided filler.

12. A composition according to claim 1, which contains from 0.25 to 3% by weight, based on fillers, of amphoteric water-soluble copolymers.

13. A process for the preparation of an aqueous slurry composition as defined in claim 1, which composition comprises from 0.1 to 5% by weight, based on said at least finely divided filler, of said at least one water-soluble amphoteric copolymer, said process comprising (1) adding said water-soluble amphoteric copolymer to an aqueous slurry which contains at least one finely divided filler and, optionally, at least one dispersant, or (2) introducing the aqueous slurry of at least one finely divided filler into an aqueous solution of said amphoteric copolymer, and the constituents are brought in each case (1) or (2) into intimate contact with one another.

14. A method comprising adding the aqueous slurry composition as defined in claim 1 as a draining aid to paper stock in the production of filler-containing paper, filler-containing cardboard or filler-containing board.

15. A process according to claim 14, wherein the electrophoretic mobility of the finely divided filler particles of the aqueous slurry is negative or not more than zero at a pH of 7.

16. A paper, board or cardboard modified by adding an aqueous slurry composition as defined in claim 1.

* * * * *

UNITED STATES PATENT AND TRADEMARK OFFICE
CERTIFICATE OF CORRECTION

PATENT NO. : 8,097,126 B2  
APPLICATION NO. : 11/181993  
DATED : January 17, 2012  
INVENTOR(S) : Hans-Joachim Haehnle et al.

Page 1 of 1

It is certified that error appears in the above-identified patent and that said Letters Patent is hereby corrected as shown below:

On the title page, Item (54), and column 1, the title is incorrect. Item (54) and column 1, should read:

-- AQUEOUS COMPOSITION AND USE THEREOF FOR PAPERMAKING --

Signed and Sealed this  
Third Day of April, 2012

David J. Kappos  
*Director of the United States Patent and Trademark Office*